Patented Sept. 10, 1940

2,214,132

UNITED STATES PATENT OFFICE 2,214,132

TITANIUM OXIDE PIGMENT AND PROCESS OF PRODUCING SAME

Charles Royer Hager, Baltimore, Md., assignor to E. I. du Pont de Nemours & Company, Wilmington, Del., a corporation of Delaware No Drawing. Application December 27, 1937, Serial No. 181,990

7 Claims. (Cl. 134—58)

This invention relates to the art of titanium oxide pigments. More particularly it relates to the production of white titanium oxide pigments. Still more particularly it relates to the elimination of the yellow tint of calcined white titanium oxide pigments.

White titanium oxide pigments are usually produced by calcination or other heat treatments of a precipitated pigment material comprising titanium oxide. Such titanium oxide pigments are white within the term as usually understood in the pigment industry; that is to say, they are of a reflectivity and color at least as good as the widely used white pigment, basic carbonate white lead. Within this range of whiteness, however, it is common for experienced workers in the art to distinguish differences in subordinate tints which usually are within two ranges, namely, a yellowish tint and a bluish tint.

Usually the subordinate tint of a white titanium oxide pigment is determined by comparison of pastes in a light colored linseed oil of a standard titanium oxide pigment and the titanium oxide pigment being tested. The titanium oxide pigments are lightly mulled in the linseed oil to break down aggregates and the smooth pastes so produced are drawn down on a white porcelain palette. The paste from the standard pigment and the paste from the pigment to be tested are applied side by side on the palette so that they are in contact allowing close comparison. It is further important to have the pastes so drawn down that the surfaces are smooth and not rough or sandy. The standard pigment is one chosen as being neutral in tint possessing neither a definite bluish nor a definite yellowish tint. The pigment to be tested is compared with this standard and the degree of blue tint or yellow tint is graded numerically. For example, one degree of blueness represents the least perceptible difference in tint from the neutral standard. Two degrees of blueness, e. g. 2B represents a definite contrast. Similarly, one degree of yellowness represents the least perceptible difference in tint from the neutral standard. Two degrees of yellowness, e. g. 2Y represents a definite contrast.

It is well known in the art that white materials which have a bluish tint are ordinarily considered to be of better quality, to be "whiter" whites and to have a more pleasing color than neutral white materials or white materials which have a yellowish tint. For example, a white paper with a bluish tint is considered to be brighter than a corresponding neutral white or yellowish white paper of even higher reflectivity. Furthermore, white fabrics are considered to be brighter when they have a bluish tint and for this reason bluing is used in laundering operations. Again, so-called neutral white paints are colored with blue pigments to a slight but definite bluish tint because of the fact that painters associate blue whiteness with quality. This preference for blue whites and this notion that blue whites are brighter than neutral or yellow whites of equal or even higher reflectivity probably results from the fact that such materials as paper, white fabrics, paint films and the like comprising naturally occurring materials turn yellow on aging and the extent of this yellowing is greater the poorer the quality of the material.

Calcined white titanium oxide pigments manufactured according to the prior art tend to have a yellow tint which is considered to be due in part to the presence of slight amounts of colored impurities in the calcined pigments. For example, iron and chromium compounds are present in the ilmenite ore ordinarily used as starting material in the manufacture of titanium oxide pigments. Despite the most careful control of manufacturing conditions, traces of these compounds are not removed from the titanium oxide pigment and remain in the calcined pigment, probably as oxides. It is started that even so small a quantity as one tenth of one per cent of iron oxide, and even smaller amounts of chromium oxide, give to calcined titanium oxide pigments a noticeably yellow color.

A method of overcoming the yellowing effect of iron compounds in calcined titanium oxide pigments by converting them to black ferrous titanate is disclosed in U. S. Patent 1,975,339. However, on account of the dilution of the white titanium oxide pigment with the black ferrous titanate, this process produces a significant reduction in the reflectivity of the titanium oxide pigment. Furthermore, it is a process which is not applicable in the continuous calcining units normally used for the calcination of titanium oxide pigments. In practice, the usual method of overcoming the yellow tint of white calcined titanium oxide pigment is by mixing a blue pigment such as ultramarine blue with the white pigment. This treatment masks the yellow tint of the white pigment but it produces a product with a muddy and not a clean blue tint. Furthermore, ultramarine blue is not resistant to acids and the tinted pigment becomes yellow again when placed in acid media.

This invention has as an object the production of neutral white titanium oxide pigments from yellowish white calcined titanium oxide pigments. A further object is the production of white titanium oxide pigments of clean slight blue tint from yellowish white or neutral white calcined titanium oxide pigments. A still further object is the production of white titanium oxide pigments of clean definite blue tint from yellowish white, neutral white or slightly bluish white calcined titanium oxide pigments. A still further object is the improvement and/or alteration of the tints of pigments other than white. Additional objects will become apparent from an examination of the following description and claims.

These objects are accomplished by the following invention which broadly comprises adding small amounts of trivalent titanium compounds to calcined titanium oxide pigments. In a more restricted sense this invention comprises adding from about 0.005 per cent to about 1 per cent of trivalent titanium compound, calculated as titanium and based upon the weight of titanium oxide pigment, to the calcined titanium oxide pigment. The preferred embodiment of this invention comprises adding from about 0.01 per cent to about 0.1 per cent calculated as titanium of trivalent titanium compound in solution to a suspension of wet milled calcined titanium oxide pigment or to dry milled calcined titanium oxide pigment.

In practicing my invention various methods of adding trivalent titanium to white calcined titanium oxide pigment are possible. The trivalent titanium compound used may be a solution of a salt of such acids as sulfuric, hydrochloric and the like. It may be prepared from a solution of the corresponding tetravalent titanium compound by any of the well known methods such as by electrolytic reduction or by reduction with such metals as zinc or tin. In the preferred embodiment of my process a solution of titanous sulfate prepared by reduction of titanic sulfate with metallic zinc is used as pigment treating agent.

In one embodiment of my invention a solution of a titanous salt such as titanous chloride, titanous bromide, or titanous sulfate, is added to the hydroseparator overflow of calcined titanium oxide pigment obtained by processes such as that of U. S. Patent 1,937,037. The pigment thus treated is subsequently coagulated, filtered, dried and dry milled.

In another embodiment of my invention a solution of a titanous salt such as titanous chloride, titanous bromide, or titanous sulfate, is added to the coagulated calcined titanium oxide pigment slurry of processes such as that of U. S. Patent 1,937,037 prior to filtering, drying and dry milling of said calcined titanium oxide pigment.

In still another embodiment of my invention a solution of a titanous salt such as titanous chloride, titanous bromide, or titanous sulfate, is added to dry wet milled or unmilled calcined titanium oxide pigment prior to or subsequent to dry milling.

The following example is given for illustrative purposes only and is not intended to place any restriction on the herein described invention:

A titanous sulfate solution was made by dissolving hydrolytically precipitated and purified titanium dioxide in concentrated (96%) sulfuric acid. This solution contained about 105 grams of tetravalent titanium per liter. It was diluted with water to about 5 times its volume and 20 mesh zinc was added to reduce the tetravalent titanium to the trivalent form. The reduced solution contained about 21 grams of trivalent titanium per liter. The titanous solution was added to 350 g./l. coagulated wet milled calcined titanium dioxide slurry in the amount of 8 ml. of titanous solution per liter of titanium dioxide slurry to obtain about 0.048% addition of trivalent titanium based on the weight of the calcined titanium dioxide pigment. This slurry was filtered and dried for 4 hours at 160° C. This treatment produced a white pigment with a definite clean blue tint which was graded 4B as compared to 2B for the untreated pigment.

The amount of titanous compound required by a given calcined titanium oxide pigment can best be learned by experimental trial and the amount will vary with the tint and previous history of the titanium oxide pigment and the tint desired in the finished product. Appreciable effects are obtained by treatment of a calcined titanium oxide pigment with as little as about 0.005% of trivalent titanium. For increased effects as much as about 1% of trivalent titanium may be used. However, an amount of titanous compound equivalent to from about 0.01% to about 0.1% trivalent titanium is preferred.

While my invention is particularly applicable to calcined titanium dioxide pigment it must be understood that it is also applicable to all types of white titanium oxide pigment materials such as calcined titanium oxide, white calcined titanates of divalent metals and calcined titanium oxide extended with calcium sulfate, barium sulfate, magnesium silicate, calcium carbonate, lithopone, zinc sulfide, and the like. Furthermore, it may also be used to improve and/or alter the tints of pigments other than white comprising calcined titanium oxide.

My process provides an easy method for the adjustment of the subordinate tint of a white titanium pigment from the yellow side to the blue side. This change of tint may be due to a combination of the inherent color and the reducing power of the trivalent titanium compounds. Oxides such as iron and chromium impart color to the titanium pigment and it is possible that my treatment reduces such impurities to a lower valent state and thereby eliminates the yellowish tint that may have been caused by their presence. The excess trivalent titanium compound is blue or violet in color and is adsorbed upon the pigment being treated in the finishing operations. This adsorption allows a thorough distribution of the titanous compound and the suspension at this time consists of a calcined titanium pigment carrying a surface coating of an adsorbed titanous hydrate or hydroxide. The suspended pigment is usually dewatered in later operations and sold as a bluish white titanium pigment in powder form.

The final pigment will contain a minor amount of hydrated trivalent titanium oxide or titanous hydroxide if the amount of treatment is greater than the amount that will be oxidized in the pigment finishing operation. The pigments carrying the trivalent titanium oxide or hydroxide are naturally more blue than those in which it is absent due to the blue color of the titanous hydroxide but pigments treated by my process are more blue in tint when finished even in instances where the titanous compound has disappeared during the final dewatering and drying operations. This has led me to the conclusion that the operation was more than a correction of the tint of the calcined pigment with a blue ingredient. The evidence strongly suggests that the effect is due to the strong reducing properties of the titanous compounds as well as to the blue color of the latter. The adsorption of the titanous hydroxide by the suspended calcined titanium pigment from the dilute salt solution may also be responsible in part for the improved results which I have outlined.

My process possesses advantages not previously combined in a single process. Furthermore, the products of my process possess advantages not previously combined in a titanium oxide pigment material. My process allows the production of a titanium oxide pigment of predetermined blue tint, bluer than the original calcined titanium oxide pigment, irrespective of the degree of yellow or blue tint of the original calcined titanium oxide pigment. In addition it produces a pigment of cleaner and more uniform tint than is obtained by mixing the calcined titanium oxide pigment with blue pigments, such as ultramarine blue, by prior art methods. Furthermore, the product of my process retains its clean blue tint in the presence of acids and other compounds that have an undesirable effect on such tinting materials as ultramarine blue.

As many apparently widely different embodiments of this invention may be made without departing from the scope and spirit thereof, it is to be understood that I do not limit myself to the specific embodiment except as defined in the appended claims.

Having described the present invention the following is claimed as new and useful.

1. In a process for the production of titanium oxide pigments having a blue tint and comprising a surface coating of a minor amount of hydrated trivalent titanium oxide, the steps which comprise adding to an aqueous suspension of a calcined titanium oxide pigment an aqueous solution of a trivalent titanium compound, said trivalent titanium compound being present in an amount between about 0.005% and about 1%, calculated as titanium and based upon the weight of the titanium oxide, and thereafter drying the resulting pigment.

2. In a process for the production of titanium oxide pigments having a blue tint and comprising a surface coating of a minor amount of hydrated trivalent titanium oxide, the steps which comprise adding to an aqueous suspension of a calcined titanium oxide pigment an aqueous solution of titanous sulfate, said titanous sulfate being present in an amount between about 0.005% and about 1%, calculated as titanium and based upon the weight of the titanium oxide, and thereafter drying the resulting pigment.

3. In a process for the production of titanium oxide pigments having a blue tint and comprising a surface coating of a minor amount of hydrated trivalent titanium oxide, the steps which comprise adding to an aqueous suspension of a calcined titanium oxide pigment an aqueous solution of titanous bromide, said titanous bromide being present in an amount between about 0.005% and about 1%, calculated as titanium and based upon the weight of the titanium oxide, and thereafter drying the resulting pigment.

4. In a process for the production of titanium oxide pigments having a blue tint and comprising a surface coating of a minor amount of hydrated trivalent titanium oxide, the steps which comprise adding to an aqueous suspension of a calcined titanium oxide pigment an aqueous solution of titanous chloride, said titanous chloride being present in an amount between about 0.005% and about 1%, calculated as titanium and based upon the weight of the titanium oxide, and thereafter drying the resulting pigment.

5. In a process for the production of titanium oxide pigments having a blue tint and comprising a surface coating of a minor amount of hydrated trivalent titanium oxide, the steps which comprise adding to an aqueous suspension of a wet milled calcined titanium dioxide pigment an aqueous solution of titanous sulfate, said titanous sulfate being present in an amount between about 0.01% and about 0.1%, calculated as titanium and based upon the weight of the titanium dioxide, and thereafter drying the resulting pigment.

6. In a process for the production of titanium oxide pigments having a blue tint and comprising a surface coating of a minor amount of hydrated trivalent titanium oxide, the steps which comprise adding to an aqueous suspension of a wet milled calcined titanium dioxide pigment an aqueous solution of titanous bromide, said titanous bromide being present in an amount between about 0.01% and about 0.1%, calculated as titanium and based upon the weight of the titanium dioxide, and thereafter drying the resulting pigment.

7. In a process for the production of titanium oxide pigments having a blue tint and comprising a surface coating of a minor amount of hydrated trivalent titanium oxide, the steps which comprise adding to an aqueous suspension of a wet milled calcined titanium dioxide pigment an aqueous solution of titanous chloride, said titanous chloride being present in an amount between about 0.01% and about 0.1%, calculated as titanium and based upon the weight of the titanium dioxide, and thereafter drying the resulting pigment.

CHARLES ROYER HAGER.